United States Patent
Gong et al.

(10) Patent No.: US 9,543,844 B2
(45) Date of Patent: Jan. 10, 2017

(54) SYSTEM AND METHOD FOR A SWITCHED-MODE POWER SUPPLY

(71) Applicant: Infineon Technologies Austria AG, Villach (AT)

(72) Inventors: Xiao Wu Gong, Singapore (SG); Kok Kee Lim, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 83 days.

(21) Appl. No.: 14/242,357

(22) Filed: Apr. 1, 2014

(65) Prior Publication Data

US 2015/0280573 A1    Oct. 1, 2015

(51) Int. Cl.
*H02M 3/335*    (2006.01)

(52) U.S. Cl.
CPC ..... *H02M 3/33507* (2013.01); *H02M 3/33523* (2013.01); *H02M 3/33592* (2013.01); *Y02B 70/1475* (2013.01)

(58) Field of Classification Search
CPC ............. H02M 3/33592; H02M 3/33507; H02M 3/33523; Y02B 70/1475
USPC ............................ 363/21.06, 21.14, 127
See application file for complete search history.

(56) References Cited

U.S. PATENT DOCUMENTS

| | | | |
|---|---|---|---|
| 7,773,733 B2 | 8/2010 | Bark et al. | |
| 8,837,184 B2* | 9/2014 | Hsu ............... | H02M 1/08 363/127 |
| 8,908,393 B2* | 12/2014 | Ye ................... | H02M 3/33592 363/21.06 |
| 8,976,547 B2* | 3/2015 | Ren ............... | H02M 1/32 363/21.14 |
| 8,976,561 B2* | 3/2015 | Balakrishnan ... | H01L 23/49575 363/147 |
| 2005/0205679 A1 | 9/2005 | Alihodzic | |
| 2007/0103946 A1* | 5/2007 | Kyono ............ | H02M 3/33592 363/21.14 |
| 2009/0268494 A1* | 10/2009 | Hu ................. | H02M 1/08 363/89 |
| 2013/0235620 A1 | 9/2013 | Morris et al. | |
| 2014/0192565 A1* | 7/2014 | Wang ............. | H02M 3/33592 363/21.14 |

(Continued)

FOREIGN PATENT DOCUMENTS

DE    102004013177 A1    10/2005

OTHER PUBLICATIONS

"Charger Interface Physical Layer IC," CHY100, ChiPhy™ Family, Power Integrations, www.powerint.com, Jul. 2013, 6 pgs.
Zhang, J. et al., "A High Efficiency Synchronous Rectifier Flyback for High Density AC/DC Adapter: Application Report," Texas Instruments, Literature No. SLUA604, Aug. 2011, 29 pgs.

(Continued)

*Primary Examiner* — Gary L Laxton
*Assistant Examiner* — Kyle J Moody
(74) *Attorney, Agent, or Firm* — Slater Matsil, LLP (57) ABSTRACT

In accordance with an embodiment, a method of operating a switched-mode power supply includes synchronously rectifying a current in a secondary side of the switched-mode power supply by detecting a voltage drop of a secondary winding of a transformer and activating a semiconductor switch coupled to the secondary winding when the voltage drop is detected. The method also includes determining a digital signal transmitting the digital signal to a controller coupled to a primary winding of the transformer by switching the semiconductor switch in accordance with the digital signal.

24 Claims, 8 Drawing Sheets

(56) References Cited

U.S. PATENT DOCUMENTS

| | | | |
|---|---|---|---|
| 2014/0204619 A1* | 7/2014 | Telefus | H02M 3/33576 363/21.01 |
| 2014/0268901 A1* | 9/2014 | Telefus | H02M 3/33576 363/21.01 |
| 2014/0268911 A1* | 9/2014 | Telefus | H02M 3/33523 363/21.08 |
| 2014/0268914 A1* | 9/2014 | Wang | H02M 3/33592 363/21.13 |
| 2014/0362611 A1* | 12/2014 | Lin | H02M 3/33592 363/21.14 |
| 2015/0124495 A1* | 5/2015 | Kong | H02M 3/33592 363/21.14 |
| 2015/0229224 A1* | 8/2015 | Werner | H02M 3/33515 363/21.13 |
| 2015/0280584 A1* | 10/2015 | Gong | H02M 3/33515 363/21.13 |

OTHER PUBLICATIONS

Hua, S. et al., "Application Notes for AP4340/L System Solution," Application Note 1078, BCD Semiconductor Manufacturing Limited, Rev. 1.0, Mar. 2012, 3 pgs.

"FSEZ1317—Primary-Side-Regulation PWM with Power MOSFET Integrated," Fairchild Semiconductor Corp., Power Supply WebDesigner, www.fairchildsemi.com, Rev. 1.0.5, Jan. 2011, 17 pgs.

"GreenChip synchronous rectifier controller," TEA1792TS, NXP Semiconductors, Product data sheet, Rev. 3, Jan. 29, 2014, 13 pgs.

"Cost effective, ultra-low standby and high performance battery charging," NXP GreenChip HV start-up flyback controller TEA1720A, NXP Semiconductor N.V., www.nxp.com, Feb. 2013, 2 pgs.

* cited by examiner

SYSTEM AND METHOD FOR A SWITCHED-MODE POWER SUPPLY

TECHNICAL FIELD

The present disclosure relates generally to an electronic device, and more particularly to a system and method for a switched mode power supply.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

A SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

One application of an SMPS is a charger for a lithium ion battery. Since lithium-ion batteries are prone to damage if an upper voltage limit is exceeded, it is common to charge the battery with a constant current until the output voltage reaches a target voltage. As result, such a battery charger may utilize a SMPS that is configured to provide a constant current. Because such battery chargers may convert AC current from a wall socket to a DC current, flyback converters that use a transformer are commonly used to provide galvanic isolation from the AC mains to the battery being charged.

SUMMARY OF THE INVENTION

In accordance with an embodiment, a method of operating a switched-mode power supply includes synchronously rectifying a current in a secondary side of the switched-mode power supply by detecting a voltage drop of a secondary winding of a transformer and activating a semiconductor switch coupled to the secondary winding when the voltage drop is detected. The method also includes determining a digital signal transmitting the digital signal to a controller coupled to a primary winding of the transformer by switching the semiconductor switch in accordance with the digital signal.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 includes FIG. 1a that illustrates schematic of an embodiment switched mode power supply and FIG. 1b that illustrates a representative waveform diagram of the switched-mode power supply;

FIG. 2 includes 2a illustrates an embodiment synchronous rectifier circuit and FIG. 2b that illustrates a corresponding waveform diagram;

FIG. 3 includes FIG. 3a that illustrates an embodiment wakeup detection circuit and FIG. 3b that illustrates a waveform diagram showing the operation of the embodiment wakeup detection circuit;

FIG. 4 includes FIG. 4a that illustrates an embodiment secondary side to primary side data transmission circuit and FIG. 4b that illustrates a waveform diagram showing the operation of the embodiment secondary side to primary side data transmission circuit;

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a switched-mode power supply in a flyback configuration. Embodiments of the present invention may also be applied to other switched-mode power supply configurations and other systems and applications including other circuits that switch including, but not limited to power systems and motor control systems.

In an embodiment of the present invention, communication from the secondary side to the primary side of a switched-mode flyback converter is implemented using the switching transistor of a secondary side synchronous rectifier to perform communication in addition to its function as a rectifying switch. Such a communication scheme may be used in a flyback converter that performs primary side control of its output voltage and/or output current. In an embodiment, the switching transistor is pulsed when the output voltage of the switched-mode flyback converter falls below a predetermined voltage threshold. When the primary side controller receives the corresponding signal via an auxiliary winding of the transformer, the primary side controller resumes burst-mode switching. In another example, a digital interface is coupled to the secondary side of the switched-more flyback converter. When a request to change the output voltage is received via the digital interface, the primary-side controller receives a digital signal via the secondary-side switching transistor and the transformer indicating a selected output power supply voltage. In an embodiment, synchronous rectifier, wakeup detection and digital transmission of received commands may be integrated together on a single secondary-side controller IC.

Figure 1A:
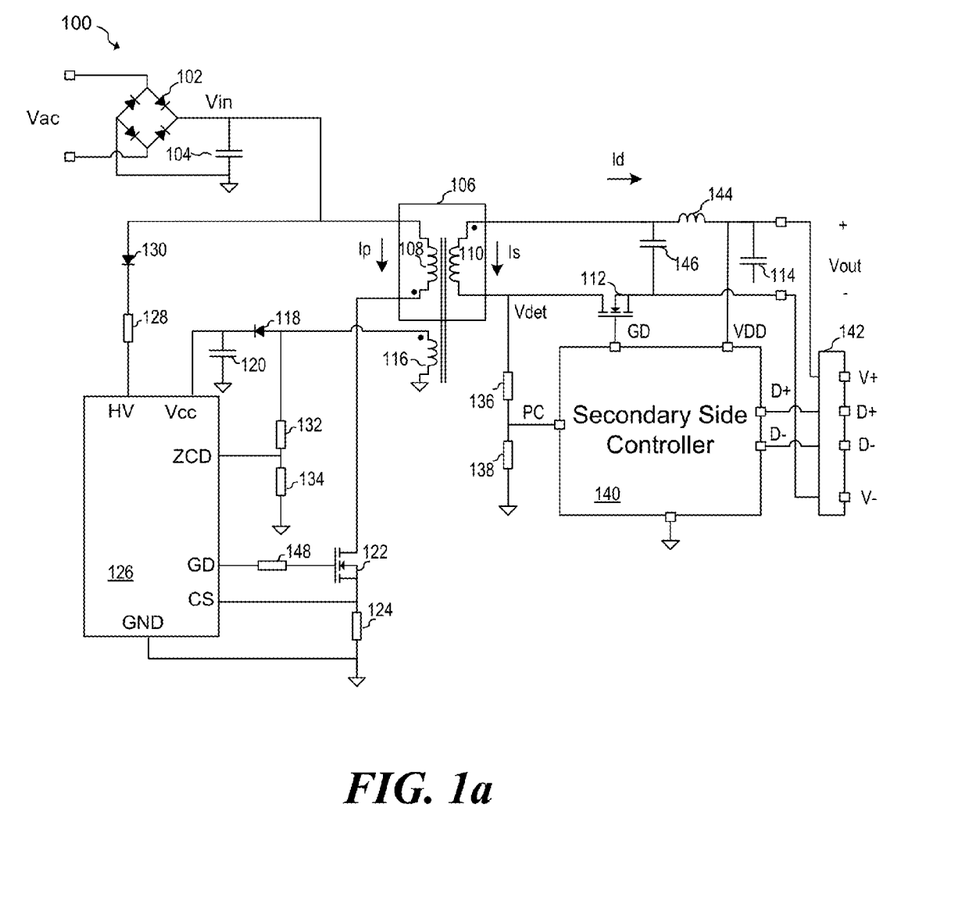

FIG. 1a illustrates embodiment switched-mode flyback converter 100 that includes diode bridge rectifier 102, transformer 106, switching transistor 122 and controller 126 on the primary side and switching transistor 112 controller by secondary controller integrated circuit (IC) 140 on the secondary side. Diode bridge rectifier 102 converts AC voltage Vac, which may represent, for example, an AC mains voltage to DC voltage Vin coupled to primary winding 108 of transformer 106. Residual ripple from the rectifying operation is filtered by input filter capacitor 104. The switching action of switching transistor 122 magnetizes and demagnetizes primary winding 108 of transformer 106 to transfer power from primary winding 108 to secondary winding 110 with a DC output Vout. The output current at secondary winding 110 is rectified with switching transistor 112 controlled by secondary controller IC 140, which together function as a synchronous rectifier.

As shown, secondary winding 110 does not have a feedback network coupled from the secondary side of transformer 106 to the primary side of transformer 106. Rather, switched-mode flyback converter 100 derives its feedback voltage by monitoring the voltage of auxiliary winding 116 that is magnetically coupled to transformer 106. This feedback voltage from auxiliary winding 116 is monitored by controller 126 at pin ZCD via a voltage divider implemented using resistors 132 and 134. In addition, controller 126 may perform a measurement of the primary side current by monitoring the voltage across current sensing resistor 124 coupled to the source of switching transistor 122 at pin CS. Based on feedback taken from pins ZCD and CS, controller 126 produces a switching pattern at pin GD coupled to the gate of switching transistor 122 via gate resistor 148 to maintain a generally stable output voltage and/or output current. During operation, power is provided to controller 126 via auxiliary winding 116, diode 118 and capacitor 120. During startup, controller 126 may receive power from voltage Vin via resistor 128 and diode 130. In an embodiment, the output voltage of embodiment switched-mode flyback converter 100 is filtered using a low pass filter that includes capacitor 146, inductor 144, and output capacitor 114.

Secondary controller IC 140 provides a switching signal to switching transistor 112 via pin GD to provide synchronous rectification and to provide communication from the secondary side of transformer 106 to the controller 126. In one embodiment, the state of secondary winding 110 is input to secondary controller IC 140 via pin PC that is coupled to secondary winding 110 via a voltage divider made of resistors 136 and 138. Alternatively, secondary controller IC 140 may be coupled to secondary winding 110 using other synchronous rectifier circuits and methods known in the art. As shown, output voltage Vout is coupled to connector 142 via output pins V+ and V−. Communication pins D+ and D− are coupled between connector 142 and secondary controller IC 140. In one embodiment, connector 142 may be a Universal Serial Bus (USB) connector. Alternatively, other connector types may be used.

Figure 1B:
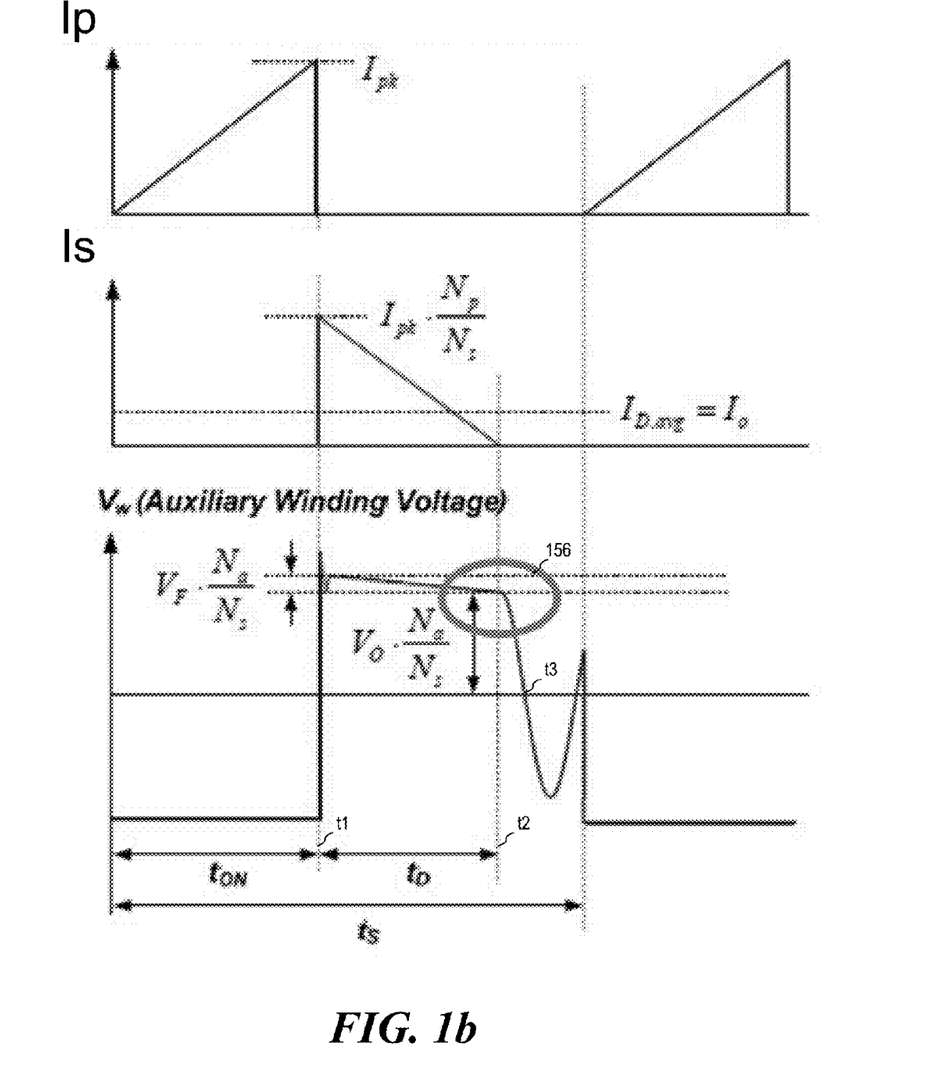

Referring to FIG. 1b, the primary winding current Ip increases when node GD activates switching transistor 122, for example, during time $t_{on}$. The slope of the increase of the primary current IP when switching transistor 122 is activated is substantially proportional to the voltage level of the input voltage Vin and substantially inversely proportional to the inductance L of the primary winding 108 and the transformer, respectively. That is:

$$dIin/dt = Vin/L.$$

When switching transistor 122 is activated, a voltage across primary winding 108 substantially corresponds to voltage Vin and a voltage across secondary winding 110 substantially corresponds to −N22/N21·Vin, where N21 represents the number of windings of primary winding 108 and N22 represents the number of windings of secondary winding 110. As the voltage Vw across the secondary winding 110 is negative during on-period $t_{on}$, which is by virtue of the primary winding 108 and the secondary winding 110 having opposite winding senses, current Is through the secondary winding 110 is zero when switching transistor 122 is activated.

When switching transistor 122 is deactivated, for example, at time t1, the voltage across the primary winding 108 and the voltage across the secondary winding 110 reverses polarity and increases until the voltage across the secondary winding 110 substantially corresponds to the output voltage Vout. Switching transistor 122 deactivated, primary winding 108 is demagnetized and transfers the energy that was inductively stored in the primary winding 108 to secondary winding 110 and to output Vout. As shown, primary current Ip decreases to zero at times t1 when switching transistor 122 is shut off, and current Is though secondary winding 110, which was zero when switching transistor 122 was active, jumps to a level at the time t1 and then starts to decrease.

By virtue of the inductive coupling between the auxiliary winding 116 and the primary winding 108, the voltage level of the auxiliary voltage Vw during the time that switching transistor 122 is active (i.e., when driving voltage GD is high) substantially corresponds to $$Vw = N23/N21 \cdot Vin,$$

where N23 represents the number of windings of the auxiliary winding 116. When switching transistor 122 is inactive, (i.e., when node GD is low), the voltage level of the auxiliary voltage Vaux substantially corresponds to $$Vaux = N23/N22 \cdot Vout$$

as long as the current Is through the secondary winding 110 has not decreased to zero. As the secondary side current Is decreases to zero, that is, as the transformer is completely demagnetized, the secondary side voltage and, consequently, the auxiliary voltage Vw becomes zero. Parasitic effects such as, for example, parasitic capacitances of the transformer may cause ringing or oscillations of the auxiliary voltage Vw, at the time when transformer 106 has become demagnetized, as shown in the plot of Vw starting at time t2. This ringing occurs because the synchronous rectifier on the secondary side of transformer 106 reverses polarity and presents an open circuit to secondary winding 110. As such, the impedance at the drain of switching transistor 122 appears as a parallel resonance that includes the inductance of primary winding 108 in parallel with the capacitance coupled to the drain of the switching transistor.

Controller 126 may use this ringing phenomenon to determine when the secondary winding 110 has become demagnetized in order to perform a primary-side control of the output current. For example, by controlling the peak primary current Ip and the ratio of the time during which secondary winding 110 is discharging ($t_D$) to the total cycle time ($t_s$), the output current and/or output voltage to the power supply load is controllable. The onset of this ringing may be detected, for example, by detecting a zero crossing of auxiliary winding voltage Vw, or by detecting the knee point 156 of auxiliary winding voltage Vw.

In systems that do not utilize synchronous rectification, a diode is often used to rectify secondary current Is. In such cases the output power of the secondary side is:

$$P_{seccondary} = (V_{FR} + Vout) \cdot Is,$$

where $P_{seccondary}$ is the output power of the secondary side, $V_{FR}$ is the forward diode voltage of the rectifying diode. This forward voltage of the rectifying diode represents a loss of power that results in a loss of efficiency. By turning switching transistor 112 on and off synchronously with the primary side switching transistor 122, the effective forward voltage of the rectifier can me made very low, for example, less than 0.1 V, thereby increasing the efficiency of the resulting power converter.

In an embodiment, secondary side switching transistor 112 is turned on by detecting the voltage drop of secondary side winding. The turn-off timing of switching transistor 112 is determined by prediction timing control and its operation principle is based on a peak current equation for primary and secondary side. During turn off period $t_D$, secondary side peak current is as follows $$I_{SP} = \frac{N_P}{N_S} \times I_{PP}, \quad (2)$$

where ISP is the peak current of secondary side winding; IPP is the peak current of primary side winding; NP is the primary winding turns; NS is the secondary winding turns. Also $$I_{PP} = \frac{V_{in}}{L_P} \times T_{on} \quad (3)$$

$$I_{SP} = \frac{V_{out}}{L_S} \times T_{DET} \quad (4)$$

where $L_P$ is the primary side winding inductance; $V_{in}$ is the primary side input voltage; $V_{out}$ is the system output voltage; $T_{on}$ is the primary side power MOSFET turned on time; and $T_{DET}$ is the timing for secondary side winding demagnetization.

Inserting equation (3) and (4) into equation (2), yields:

$$\frac{V_{out}}{L_S} \times T_{DET} = \frac{N_P}{N_S} \times \frac{V_{in}}{L_P} \times T_{on} \quad (5)$$

$$\frac{N_P}{N_S} = \sqrt{\frac{L_P}{L_S}} = n \quad (6)$$

Therefore, $$\frac{V_{in} \times T_{on}}{n} = V_{out} \times T_{DET}. \quad (7)$$

From this equation, the inductor average voltage is zero during a switching period in steady state, so the product of charge voltage and charge time is equal to the product of discharge voltage and discharge time. In flyback converters, the charge voltage on the magnetizing inductor is input voltage (Vin/n), while the discharge voltage is Vout.

In accordance with an embodiment, the PC pin of secondary controller IC 140 is connected to a voltage divider to sense the secondary side winding voltage Vw during primary side switching transistor 122 turn-on time. Thus, $V_{in}/n$, $T_{on}$, and $V_{OUT}$ can be obtained. Moreover, $T_{DET}$, which is the on-time of switching transistor 112, can be predicted by equation (7). In an embodiment, secondary side switching transistor 112 is turned on when the switching transistor 112 body diode starts conducting and secondary side winding voltage drops to zero. Switching transistor 112 is turned off by perdition timing control as shown in equation (8), $$T_{DET} = \frac{V_{IN} \times T_{on}}{n \times V_{OUT}}. \quad (8)$$

Figure 2A:
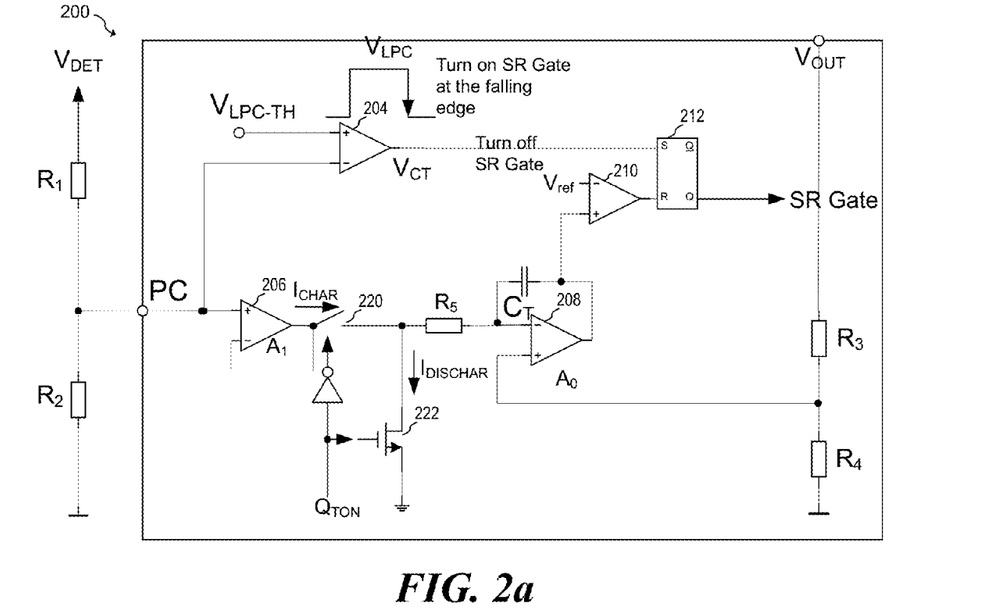
Figure 2B:
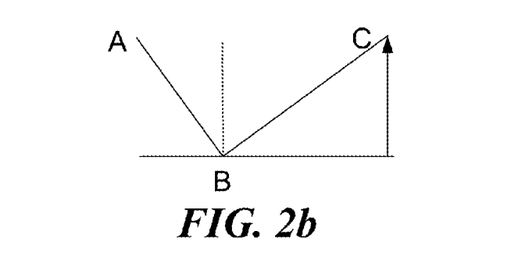

FIG. 2a illustrates an embodiment synchronous rectifying control circuit 200 that includes operational amplifiers (opamps) 206, 208, comparators 204, 210, and SR latch 212. FIG. 2b is a waveform diagram that shows the output of opamp $A_0$ 208 at times A, B and C during the operation of embodiment flyback converter 200.

In the circuit illustrated in FIG. 2a, when the secondary side winding voltage drops from a higher voltage to a lower voltage, secondary side switching transistor 112 turns on. How secondary side switching transistor 112 is turned off depends on the particular predictive method used. As shown, resistor R1 and R2, which correspond to resistors 136 and 138 in FIG. 1a, form a resistor divider for the voltage Vdet of secondary side winding 110. This secondary side winding voltage Vdet is equal to Vin/n+Vout during primary side power MOSFET turn-on time. Resistors R3 and R4, which may be disposed within secondary controller IC 140 form a resistor divider for output voltage of embodiment switched-mode flyback converter 100.

As shown, opamp 208 is configured as an integrator with feedback capacitor $C_T$ and series input resistors $R_5$. During operation, the input to this integrator is charged via opamp 206 configured as a unity gain buffer when logic signal $Q_{TON}$ is low and switch 220 is closed. On the other hand, when logic signal $Q_{TON}$ is high, switch 220 is open and the input to the integrator is discharged via transistor 222. The switching transistor 112 is turned on via signal SR Gate when the output voltage of Opamp 208 exceeds threshold voltage $V_{ref}$ and activated the reset input of SR latch 212; and is turned off when signal $V_{LPC-TH}$ exceeds voltage PC.

Initially, the output of opamp 208 is $V_A$ at point as shown on the waveform diagram of FIG. 2a. During primary side switching transistor 122 turn-on time, $T_{on}$, logic signal $Q_{TON}$ is high, therefore capacitor $C_T$ is discharged until point B such that:

$$V_B = V_A - \frac{\left[\left(\frac{R_2}{R_1+R_2}\right) \times \left(\frac{V_{IN}}{n} + V_{OUT}\right)\right] - \left[\left(\frac{R_4}{R_3+R_4}\right) \times V_{OUT}\right]}{R_5} \times T_{ON}. \quad (9)$$

When primary side power MOSFET is turned off, secondary side current Is drops from its peak value to 0A; logic signal $Q_{TON}$ is high(low) and during this demagnetization time, and the voltage over opamp 208 is (at point C):

$$V_C = V_B + \frac{\left(\frac{R_4}{R_3+R_4}\right) \times V_{OUT}}{R_5} \times T_{DET}. \quad (10)$$

If the output voltage of opamp 208 goes back to original voltage $V_A$, which means that change in voltage during $T_{ON}$ and change in voltage during $T_{DET}$ are the same, and $$\frac{\left[\left(\frac{R_2}{R_1+R_2}\right) \times \left(\frac{V_{IN}}{n} + V_{OUT}\right)\right] - \left[\left(\frac{R_4}{R_3+R_4}\right) \times V_{OUT}\right]}{R_5} \times T_{ON} = \quad (11)$$

-continued $$\frac{\left(\frac{R_4}{R_3+R_4}\right) \times V_{OUT}}{R_5} \times T_{DET}.$$

If resistor ratio is set as follows, $$\frac{R_2}{R_1+R_2} = \frac{R_4}{R_3+R_4}, \quad (12)$$

Then $T_{DET}$ can be calculated according to equation (7).

It should be understood the embodiment flyback converter 200 is just one example of many possible synchronous rectifier control circuits that may be used in embodiment switched-mode power converters.

Figure 3A:
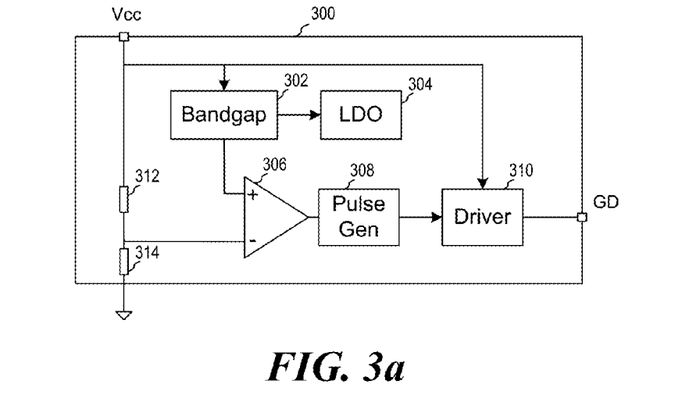

FIG. 3 illustrates an embodiment wakeup detection and transmission circuit 300. In an embodiment, comparator 306 monitors the output voltage of an embodiment power converter to a reference voltage generated by bandgap voltage generator 302. Low dropout regulator 304 may be used to power circuitry within wakeup detection and transmission circuit 300, as well as other circuitry. As shown, voltage Vcc, which may be coupled to the output voltage of a switched-mode power converter, is coupled to a voltage divider implemented by resistors 312 and 314. In alternative embodiments, bandgap voltage generator 302 may be implemented using other voltage reference circuits and the voltage divider implemented by resistors 312 and 314 may be implemented differently or omitted depending on the particular embodiments and its specifications.

During operation, when the negative input to comparator falls below the output of bandgap voltage generator 306, pulse generator 308 is triggered and a pulse is sent to the gate of secondary side switching transistor 112 via driver 310 and pin GD. Pulse generator 308 may issue a single pulse or a plurality of pulses. In some embodiments, this plurality of pulses may be according to a predetermined pattern.

In an embodiment, wakeup detection and transmission circuit 300 may operate during a burst mode when the power supply is very lightly loaded. In such a burst mode, controller 126 issue a burst of one or more pulses to switching transistor 122 to charge output Vout via transformer 106. After the series of bursts have been issued, the switching of switching transistor 122 ceases temporarily until the next series of bursts. In some embodiments, controller 126 may enter a low-power mode of operation. When wakeup detection and transmission circuit 300 detects that the output voltage of the power converter has decreased below a threshold, controller 126 is notified by pulsing switching transistor 112. This pulse may be detected on the primary side of transformer 106 by controller 126 to trigger one or more pulses during a burst mode. The primary side controller 126 may detect these pulses by detecting ringing at the ZCD pin coupled to auxiliary winding 116 caused by a switching pulse at the secondary side. Once the primary side controller 126 detects this ringing at the ZCD pin, it may then resume switching operations.

Figure 3B:
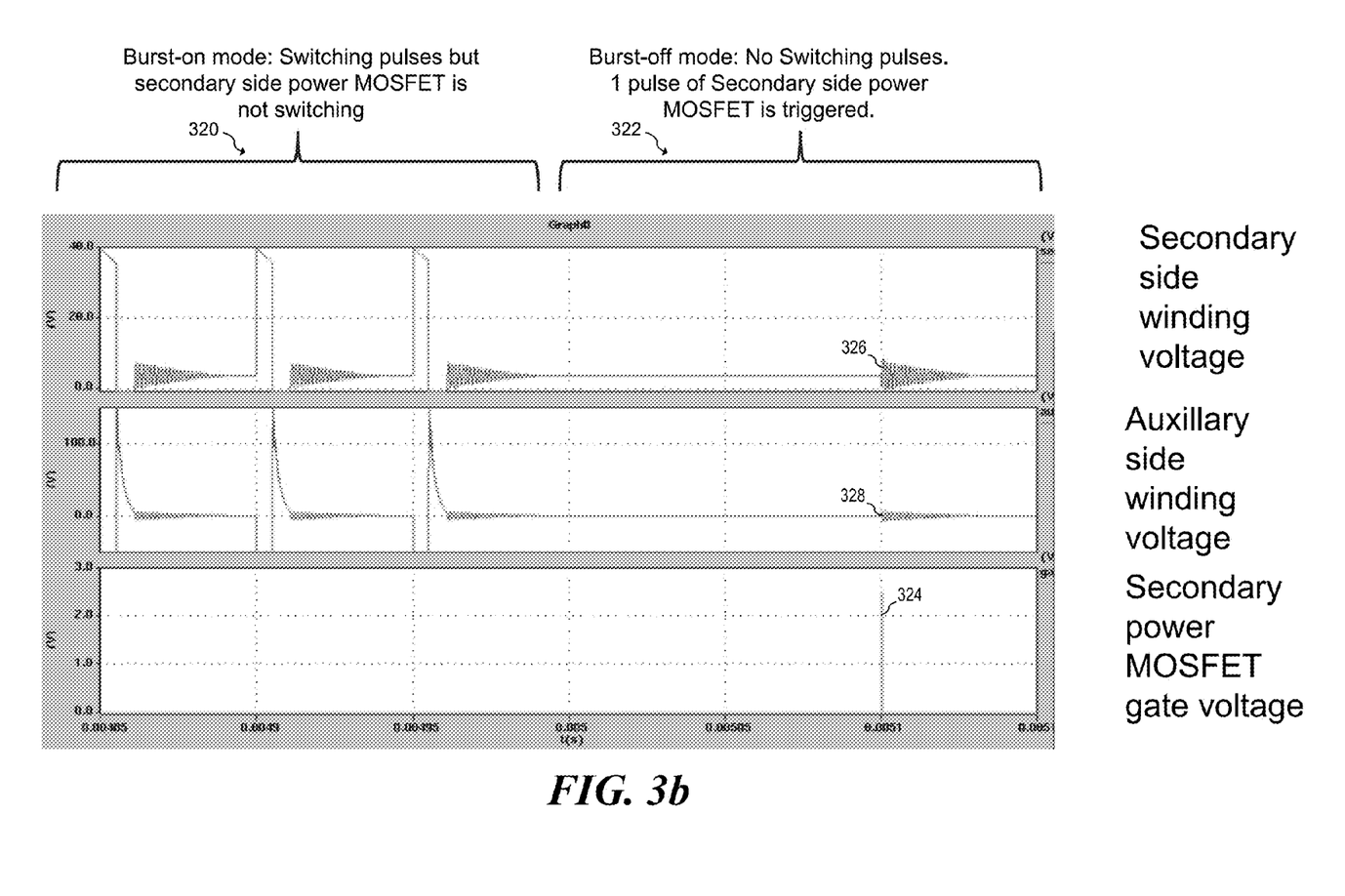

FIG. 3b illustrates a waveform a diagram illustrating the operation of wakeup detection and transmission circuit 300. The top waveform represents the secondary side winding voltage, the middle waveform represents the auxiliary side winding voltage and the bottom waveform represents the gate voltage of secondary side switching transistor, for example, switching transistor 112. During time period 320, controller 126 operates in a burst-on mode in which primary side switching transistor 122 is pulsed. In the depicted embodiment, the secondary-side switching transistor is not activated. After burst-on mode operating during time 320, a burst-off mode follows during time period 322 in which the primary side switching transistor 122 is not activated. When the output voltage falls below a specified threshold, as described above, the wakeup detection and transmission circuit 300 produces pulse 324 of the gate voltage of the secondary side switching transistor, which produces ringing 326 of the secondary side winding voltage and a corresponding ringing 328 of the auxiliary side winding voltage, as well as the primary side winding voltage (not shown). In an embodiment, controller 126 may detect ringing 328 of the auxiliary side winding voltage via pin ZCD. Alternatively, controller 126 may detect ringing present on the primary side winding.

Figure 4A:
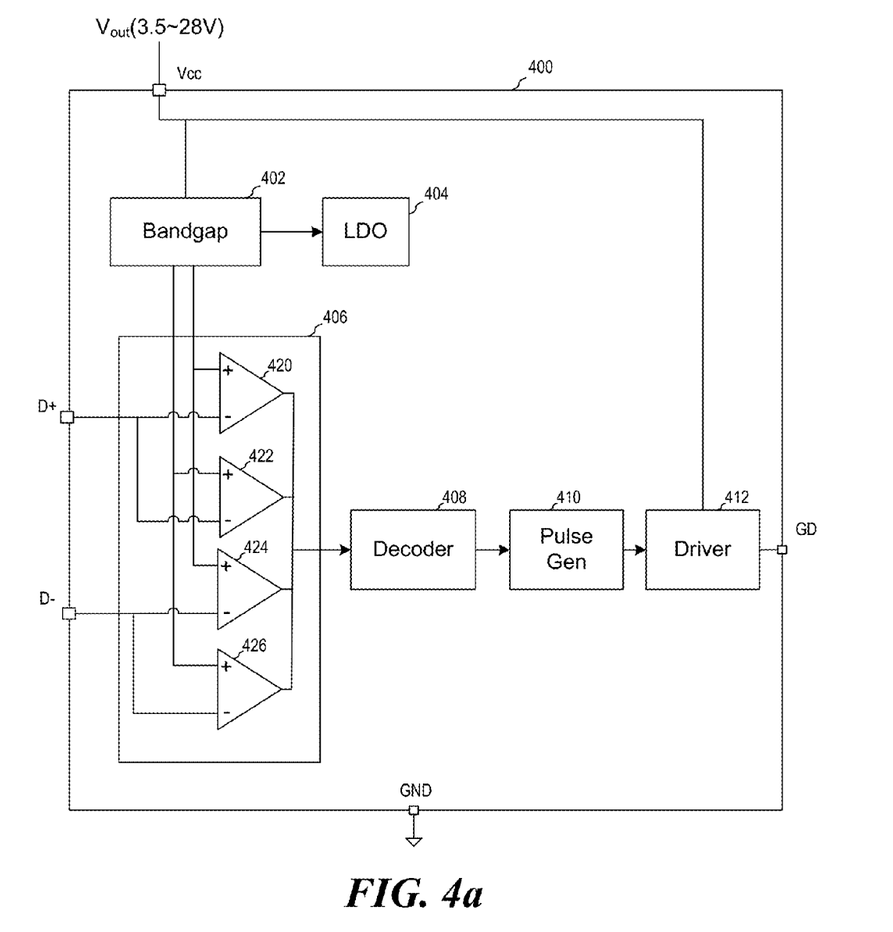

FIG. 4a illustrates an embodiment secondary-side to primary-side data transmission circuit 400 configured to transmit the logic state at pins D+ to D− to the primary controller by pulsing secondary side switching transistor. In an embodiment, the voltage at pin D+ is compared to reference voltages produced by bandgap circuit 402 via comparators 420 and 422 within comparator block 406. Similarly, the voltage at pin D− is compared to reference voltages produced by bandgap circuit 402 via comparators 424 and 426 also within comparator block 406. The output of comparator block 406 is decoded by decoder 408 and pulse generator 410 produces one or more pulses based on the output of decoder 408. These pulses may take on the form of a serial data word. These pulses are then transmitted to the secondary side switching transistor via driver 412 and pin GD. In some embodiments, a regulated power supply voltage for the driver and other circuits may be provided by LDO 404.

In the depicted embodiments, pins D+ and D− may be coupled to a USB interface and the state of these pins may represent a requested power supply voltage. The signalling at pins D+ and D− may be performed using multi-level signalling and/or may be performed by presenting a parallel or serial logic state. In alternative embodiments, other interfaces besides a USB interface may be used. Such an interface may include, but is not limited to serial interfaces such as I²C, controller area network (CAN), and others, as well as various parallel bus interfaces.

Figure 4B:
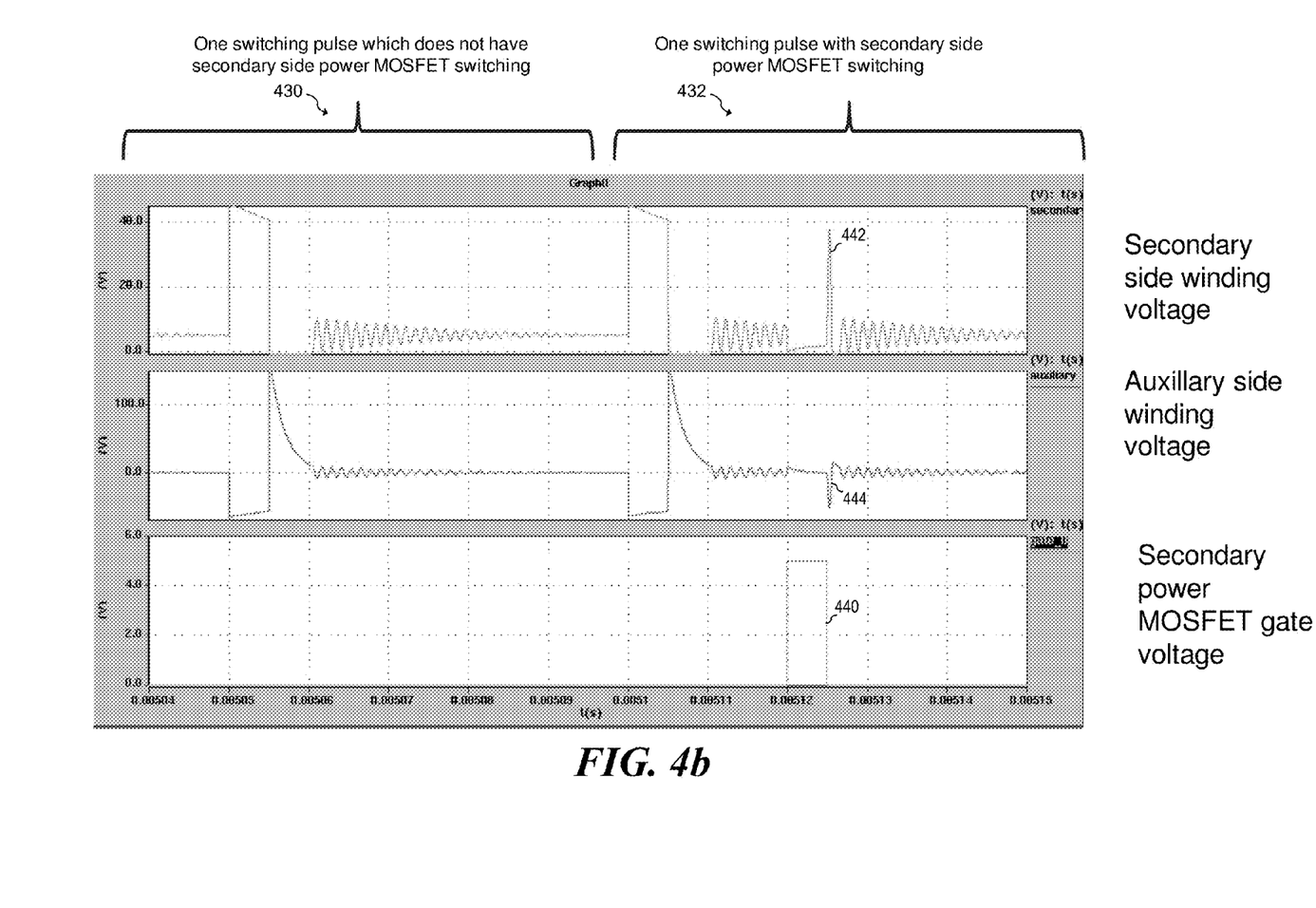

FIG. 4b illustrates a waveform a diagram illustrating the operation secondary-side to primary-side data transmission circuit 400. The top waveform represents the secondary side winding voltage, the middle waveform represents the auxiliary side winding voltage and the bottom waveform represents the gate voltage of secondary side switching transistor, for example, switching transistor 112. During time period 430, controller 126 issues switching pulses to primary side switching transistor 122, while the secondary side switching transistor 112 is not being switched.

During time period 432, secondary-side to primary-side data transmission circuit 400 produces pulse 440 of the gate voltage of the secondary side switching transistor, which produces a voltage spike and ringing 442 of the secondary side winding voltage and a corresponding voltage spike and ringing 444 of the auxiliary side winding voltage (which may be considered to be on the primary side), as well as the primary side winding voltage (not shown). In an embodiment, controller 126 may detect ringing 444 of the auxiliary side winding voltage via pin ZCD. Alternatively, controller 126 may detect ringing present on the primary side winding. In some embodiments, signalling from the secondary side to the primary side may be performed while there is switching on both the primary side and the secondary side. In such an embodiment, the gate of the secondary-side switching transistor may be pulsed during a secondary-side ringing period. For example, FIG. 4b shows that pulse 440 occurs when the secondary side winding voltage is ringing.

Figure 5:
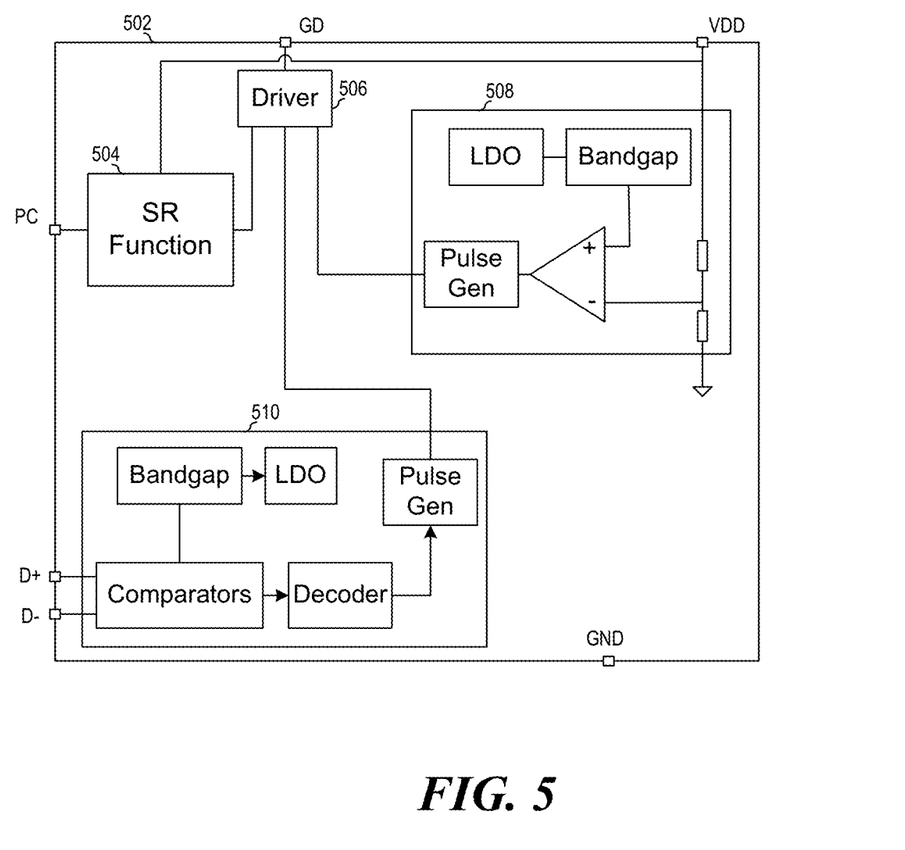
FIG. 5 illustrates a block diagram of an embodiment secondary side controller IC.

FIG. 5 illustrates a block diagram of a secondary controller IC 502 that includes synchronous rectifier circuit 504, wakeup detection circuit 508 and secondary side to primary side data transmission circuit 510. In one embodiment, these blocks may be implemented as described in embodiments described above. As shown, the outputs of synchronous rectifier circuit 504, wakeup detection circuit 508 and secondary side to primary side data transmission circuit 510 are coupled to shared driver circuit 506, the output of which is coupled to the gate of switching transistor 112 via pin GD. In some embodiments, the outputs of synchronous rectifier circuit 504, wakeup detection circuit 508 and secondary side to primary side data transmission circuit 510 are ORed together within driver 506. Alternatively, driver 506 may be implemented externally of secondary controller IC 502.

It should be understood that in alternative embodiments, secondary side IC 502 may include various combinations of SR function 504 and one or more other functions. For example, in one embodiment, a secondary side controller IC may include a subset of functions shown, in FIG. 5. For example, a secondary side controller IC may include SR function 504 and wakeup detection circuit 508 in one embodiment, and may include SR function 504 and secondary side to primary side data transmission circuit 510, or other combinations thereof.

In some specific embodiments, wakeup detection circuit 508 operation only during burst-mode operation that may be detected by the secondary controller IC by monitoring the PC pin and determining that there are no pulses detected at the PC during a certain period of time. Further, in some embodiments, secondary side to primary side data transmission circuit 510 may be active only during normal operation and not during burst-mode operation. SR function 504 may operate with secondary side to primary side data transmission circuit 510, for example, by scheduling data transmissions after the secondary side switching transistor 112 is switched off after the secondary winding is demagnetized in some embodiments.

Figure 6:
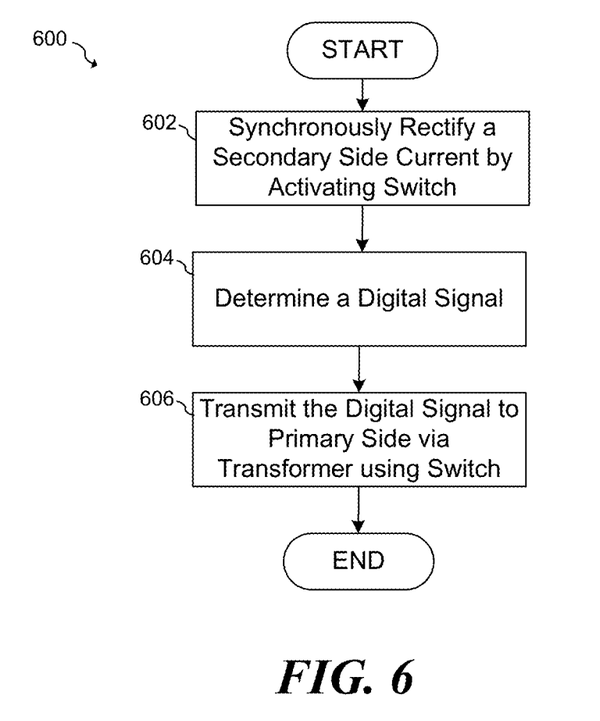
FIG. 6 illustrates a flowchart of an embodiment method.

FIG. 6 illustrates a flowchart of an embodiment method 600. In step 602, a current in a secondary winding of a transformer of a switched-mode power supply is synchronously rectified using a semiconductor switch. In an embodiment, the semiconductor switch is activated when a voltage drop of the secondary winding of the transformer is detected. In step 604, a digital signal is detected. This digital signal may include, for example, the state of an input interface coupled to the secondary side of a switched mode power supply, a lowered voltage condition of a lightly loaded power supply during a burst-off portion of a burst mode, or other conditions. Once the digital signal has been determined, the digital signal is transmitted from the secondary side of the transformer to a controller coupled to a primary side of the transformer using the semiconductor switch in step 606. This may be implemented, for example, by turning on the switching transistor in one or more pulses. The primary side controller may respond to a signaled lowed voltage condition by transitioning into a burst-on mode, and may response to a state of an input interface that requests a change in output voltage by changing a regulated output voltage to an output voltage corresponding to the received request.

In accordance with an embodiment, a method of operating a switched-mode power supply includes synchronously rectifying a current in a secondary side of the switched-mode power supply by detecting a voltage drop of a secondary winding of a transformer and activating a semiconductor switch coupled to the secondary winding when the voltage drop is detected. The method also includes determining a digital signal transmitting the digital signal to a controller coupled to a primary winding of the transformer by switching the semiconductor switch in accordance with the digital signal. In an embodiment, determining the digital signal includes receiving a signal at an input interface and producing the digital signal based on the received signal.

In an embodiment, the input interface comprises a Universal Serial Bus (USB) interface having a first signal line and a second signal line, and receiving the signal includes comparing at least one of the first signal line and the second signal line to a threshold. Producing the digital signal further may include decoding the received signal. In some embodiments, the received signal and the transmitted digital signal includes a request for an output voltage of the switched-mode power supply. In an embodiment, transmitting the switching the semiconductor switch in accordance with the digital signal causes a voltage spike on an auxiliary winding of the transformer.

The method may further include monitoring an output voltage of the switched-mode power supply, such that determining the digital signal comprises determining the digital signal based on the monitoring the output voltage. In an embodiment, monitoring the output voltage includes comparing the output voltage with a threshold and transmitting the digital signal includes transmitting a wakeup request to the controller.

In an embodiment, the digital signal includes a first digital signal and a second digital signal, and the method further includes receiving a signal at an input interface, producing the first digital signal based on the received signal, monitoring an output voltage of the switched-mode power supply, producing the second digital signal based on monitoring the output voltage.

In accordance with a further embodiment, an integrated circuit includes a synchronous rectifier controller configured to be coupled to a control node of a semiconductor switch and to a secondary winding of a transformer, and configured to detect a voltage drop of the secondary winding of a transformer and activate a semiconductor switch coupled to the secondary winding when the voltage drop is detected. The integrated circuit further includes a digital interface circuit configured to be coupled to the control node of the semiconductor switch, and configured determine a digital signal and to pulse the control node of the semiconductor switch in accordance with the digital signal. In some embodiments, the integrated circuit further includes the semiconductor switch and/or the transformer. The synchronous rectifier controller and the digital interface circuit may be disposed on a same semiconductor substrate.

In an embodiment, the integrated circuit further includes a plurality of input terminals coupled to the digital interface circuit, and the digital interface circuit is configured to determine the digital signal based on a state of the plurality of input terminals. The digital interface circuit may include a comparator coupled to at least one of the plurality of input terminals. In some embodiments, the integrated circuit further includes a decoder coupled to an output of the comparator. The plurality of terminals may be configured to be coupled to a Universal Serial Bus (USB) interface. Moreover, the digital signal may include an output voltage request for transmission to a controller coupled to a primary winding of the transformer.

In an embodiment, the integrated circuit further includes an output voltage monitoring circuit coupled to the digital interface circuit and configured to be coupled to an output voltage node of a switched mode power supply at a monitoring input terminal. The output voltage monitoring circuit may include a comparator coupled to the monitoring input terminal and a pulse generator configured to provide a wakeup request signal based on an output of the comparator.

In an embodiment, the integrated circuit further includes a plurality of input terminals further coupled to the digital interface circuit, such that the digital signal includes a first digital signal and a second digital signal, and the digital interface circuit is configured to determine the first digital signal based on a state of the plurality of input terminals. The digital interface circuit may be configured to determine the second digital signal based on an output of the voltage monitoring circuit.

In accordance with a further embodiment, a switched-mode power supply includes a transformer, a semiconductor switch coupled between a secondary winding of the transformer and an output terminal of the switched-mode power supply, and a secondary-side controller integrated circuit IC coupled to a control node of the semiconductor switch. The secondary-side controller integrated circuit IC includes a synchronous rectifier controller, an output voltage monitoring circuit and a signaling interface. The synchronous rectifier controller is coupled to a control node of a semiconductor switch and to a secondary winding of a transformer, and is configured to detect a voltage drop of the secondary winding of a transformer, and to activate the semiconductor switch when the voltage drop is detected. The output voltage monitoring circuit is coupled to the output terminal of the switched mode power supply and is configured to pulse the control node of the semiconductor switch when a voltage of output terminal node crosses a first threshold. Lastly, the signaling interface is coupled to a plurality of signaling terminals of the secondary-side controller integrated circuit IC and is configured to transmit a digital signal by pulling the control node of the semiconductor switch in accordance with a state of the plurality of signaling terminals.

In an embodiment, the plurality of signaling terminals is configured to be coupled to a Universal Serial Bus (USB) interface. The switched-mode power supply may further include a primary-side controller coupled to a primary winding of the transformer. In some embodiments, the digital signal transmitted by the signaling interface includes an output voltage request and the primary-side controller is configured to receive the output voltage request via an auxiliary winding of the transformer and to change and control the switched-mode power supply in accordance with the output voltage request.

Advantages of some embodiments include the ability to provide data from the secondary side to the primary side of a transformer isolated switched mode power supply without using additional galvanically isolated signals paths such as optocouplers and the like. Another advantage of some embodiments includes the ability of include a wakeup function, a data interface and synchronous rectification on a single IC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a switched-mode power supply, the method comprising:
   synchronously rectifying a current in a secondary side of the switched-mode power supply, wherein synchronously rectifying the current comprises detecting a voltage drop of a secondary winding of a transformer, and activating a semiconductor switch coupled to the secondary winding when the voltage drop is detected;
   determining a digital signal, wherein determining the digital signal comprises receiving a signal at an input interface and producing the digital signal based on the received signal; and
   transmitting the digital signal to a controller coupled to a primary winding of the transformer, wherein transmitting the digital signal comprises switching the semiconductor switch in accordance with the digital signal, wherein the received signal and the transmitted digital signal represent a request for a changed output voltage of the switched-mode power supply that is different from a present output voltage.

2. The method of claim 1, wherein producing the digital signal further comprises decoding the received signal.

3. The method of claim 1, wherein the step of switching the semiconductor switch in accordance with the digital signal causes a voltage spike on an auxiliary winding of the transformer.

4. The method of claim 1, further comprising monitoring an output voltage of the switched-mode power supply, wherein the digital signal is determined based on the monitoring the output voltage.

5. The method of claim 4, wherein:
   monitoring the output voltage comprises comparing the output voltage with a threshold; and
   transmitting the digital signal comprises transmitting a wakeup request to the controller.

6. A method of operating a switched-mode power supply, the method comprising:
   synchronously rectifying a current in a secondary side of the switched-mode power supply, wherein synchronously rectifying the current comprises detecting a voltage drop of a secondary winding of a transformer, and activating a semiconductor switch coupled to the secondary winding when the voltage drop is detected;
   determining a digital signal, wherein determining the digital signal comprises receiving a signal at an input interface and producing the digital signal based on the received signal; and
   transmitting the digital signal to a controller coupled to a primary winding of the transformer, wherein transmitting the digital signal comprises switching the semiconductor switch in accordance with the digital signal, wherein
      the input interface comprises a Universal Serial Bus (USB) interface comprising a first signal line and a second signal line, and
      receiving the signal comprises comparing at least one of the first signal line and the second signal line to a threshold.

7. A method of operating a switched-mode power supply, the method comprising:
   synchronously rectifying a current in a secondary side of the switched-mode power supply, wherein synchronously rectifying the current comprises detecting a voltage drop of a secondary winding of a transformer, and activating a semiconductor switch coupled to the secondary winding when the voltage drop is detected;

determining a digital signal;

transmitting the digital signal to a controller coupled to a primary winding of the transformer, wherein transmitting the digital signal comprises switching the semiconductor switch in accordance with the digital signal, wherein the digital signal comprises a first digital signal and a second digital signal;

receiving a signal at an input interface;

producing the first digital signal based on the received signal;

monitoring an output voltage of the switched-mode power supply; and producing the second digital signal based on monitoring the output voltage.

8. An integrated circuit comprising:

a synchronous rectifier controller configured to be coupled to a secondary winding of a transformer, and configured to be coupled to a control node of a semiconductor switch conductively coupled to the secondary winding of a transformer, wherein the synchronous rectifier controller is configured to detect a voltage drop of the secondary winding of the transformer, and is configured to activate the semiconductor switch when the voltage drop is detected;

a digital interface circuit configured to be coupled to the control node of the semiconductor switch conductively coupled to the secondary winding of the transformer, the digital interface circuit configured to determine a digital signal and to pulse the control node of the semiconductor switch in accordance with the digital signal; and a plurality of input terminals coupled to the digital interface circuit, wherein the digital interface circuit is configured to receive a digital command from the plurality of input terminals and determine the digital signal based on the digital command.

9. The integrated circuit of claim 8, further comprising the semiconductor switch.

10. The integrated circuit of claim 8, further comprising the transformer.

11. The integrated circuit of claim 8, wherein the synchronous rectifier controller and the digital interface circuit are disposed on a same semiconductor substrate.

12. The integrated circuit of claim 8, wherein the digital interface circuit comprises a comparator coupled to at least one of the plurality of input terminals.

13. The integrated circuit of claim 12, further comprising a decoder coupled to an output of the comparator.

14. The integrated circuit of claim 8, wherein the plurality of input terminals are configured to be coupled to a Universal Serial Bus (USB) interface.

15. The integrated circuit of claim 8, wherein the digital signal comprises an output voltage request for transmission to a controller coupled to a primary winding of the transformer.

16. The integrated circuit of claim 8, further comprising an output voltage monitoring circuit coupled to the digital interface circuit and configured to be coupled to an output voltage node of a switched mode power supply at a monitoring input terminal.

17. An integrated circuit comprising:

a synchronous rectifier controller configured to be coupled to a secondary winding of a transformer, and configured to be coupled to a control node of a semiconductor switch conductively coupled to a secondary winding of a transformer, the synchronous rectifier controller configured to detect a voltage drop of the secondary winding of the transformer, and activate the semiconductor switch when the voltage drop is detected;

a digital interface circuit configured to be coupled to the control node of the semiconductor switch conductively coupled to the secondary winding of the transformer, the digital interface circuit configured to determine a digital signal and to pulse the control node of the semiconductor switch in accordance with the digital signal; and an output voltage monitoring circuit coupled to the digital interface circuit and configured to be coupled to an output voltage node of a switched mode power supply at a monitoring input terminal, wherein the output voltage monitoring circuit comprises a comparator coupled to the monitoring input terminal, and a pulse generator having a pulse generator output coupled to the control node of the semiconductor switch, wherein the pulse generator is configured to provide a wakeup request signal at the pulse generator output based on an output of the comparator.

18. The integrated circuit of claim 17, wherein the wakeup request signal is configured to signal a termination of a burst-off mode and trigger a burst-on mode from a primary controller coupled to a primary winding of the transformer.

19. An integrated circuit comprising:

a synchronous rectifier controller configured to be coupled to a secondary winding of a transformer, and configured to be coupled to a control node of a semiconductor switch coupled to a secondary winding of a transformer, the synchronous rectifier controller configured to detect a voltage drop of the secondary winding of the transformer, and activate the semiconductor switch coupled to the secondary winding when the voltage drop is detected;

a digital interface circuit configured to be coupled to the control node of the semiconductor switch, the digital interface circuit configured to determine a digital signal and to pulse the control node of the semiconductor switch in accordance with the digital signal an output voltage monitoring circuit coupled to the digital interface circuit and configured to be coupled to an output voltage node of a switched mode power supply at a monitoring input terminal; and a plurality of input terminals further coupled to the digital interface circuit, wherein the digital signal comprises a first digital signal and a second digital signal, the digital interface circuit is configured to determine the first digital signal based on a state of the plurality of input terminals, and the digital interface circuit is configured to determine the second digital signal based on an output of the output voltage monitoring circuit.

20. The integrated circuit of claim 19, wherein the digital interface circuit comprises a USB interface circuit.

21. A switched-mode power supply comprising:

a transformer;

a semiconductor switch conductively coupled between a secondary winding of the transformer and an output terminal of the switched-mode power supply; and a secondary-side controller integrated circuit coupled to a control node of the semiconductor switch, the secondary-side controller integrated circuit comprising a synchronous rectifier controller coupled to a control node of the semiconductor switch and to a secondary winding of the transformer, the synchronous rectifier controller configured to detect a voltage drop of the secondary winding of the transformer, and activate the semiconductor switch when the voltage drop is detected, an output voltage monitoring circuit coupled to the output terminal of the switched-mode power supply, the output voltage monitoring circuit configured to pulse the control node of the semiconductor switch when a voltage of the output terminal of the switched-mode power supply crosses a first threshold, and a signaling interface coupled to a plurality of signaling terminals of the secondary-side controller integrated circuit, the signaling interface configured to receive a digital command from the plurality of signaling terminals, and transmit a digital signal by pulsing the control node of the semiconductor switch in accordance with the digital command.

22. The switched-mode power supply of claim 21, wherein the digital command comprises a request to change the voltage of the output terminal of the switched-mode power supply.

23. The switched-mode power supply of claim 21, wherein the signaling interface comprises a USB interface.

24. The switched-mode power supply of claim 21, wherein the signaling interface comprises a comparator coupled to at least one of the plurality of signaling terminals, and a decoder coupled to an output of the comparator.

* * * * *